April 4, 1961
D. W. ERICSON ET AL
2,977,985
ELECTRO-HYDRAULIC SERVO CONTROL VALVE
Filed Dec. 29, 1958
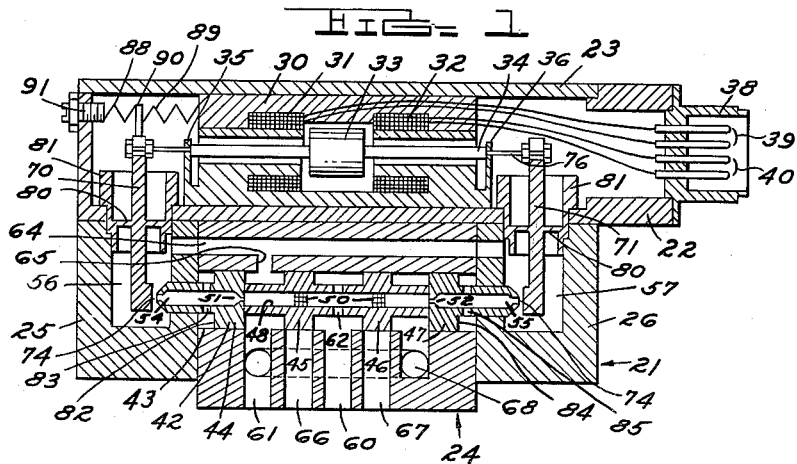
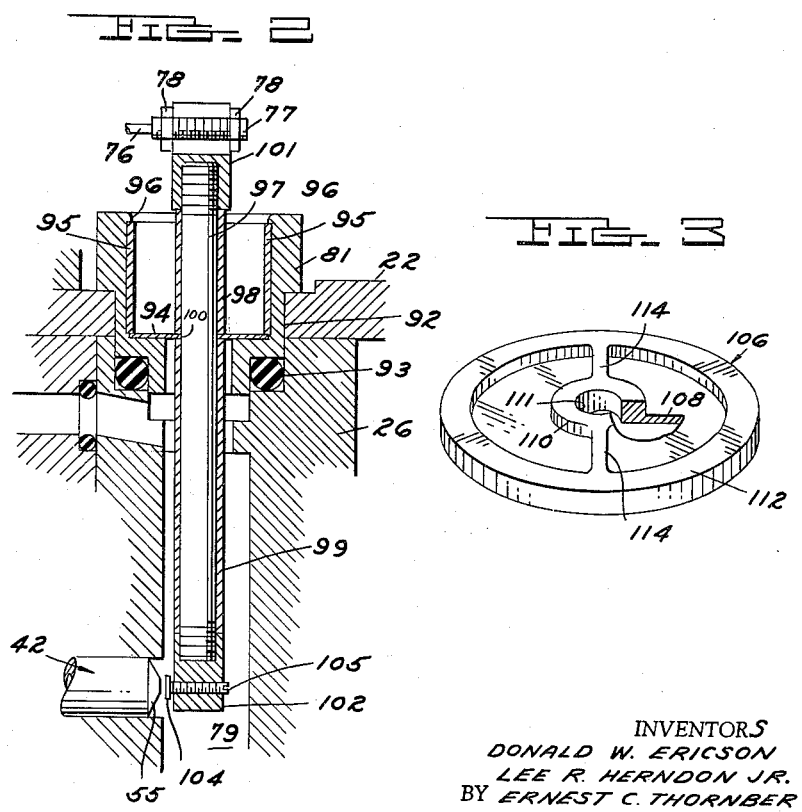
INVENTORS
DONALD W. ERICSON
LEE R. HERNDON JR.
BY ERNEST C. THORNBER
ATTORNEYS United States Patent Office 2,977,985
Patented Apr. 4, 1961

2,977,985
ELECTRO-HYDRAULIC SERVO CONTROL VALVE
Donald W. Ericson, Birmingham, Lee R. Herndon, Jr., Madison Heights, and Ernest C. Thornber, Oak Park, Mich., assignors to Pegasus Laboratories, Inc., Berkley, Mich., a corporation of Michigan Filed Dec. 29, 1958, Ser. No. 783,414

10 Claims. (Cl. 137—623)

This invention relates to an improved construction for a valve unit having a spool whose position controls the flow of hydraulic fluid between inlet, outlet and exhaust ports, an electrical actuating element, and a servo or boost system which includes means for positioning the valve spool in response to the application of an electric signal to the actuating element.

In previous valve units of this type, a servo system has been employed consisting of an internal fluid passage extending the length of the valve spool and terminating in a discharge nozzle at each end of the spool. Hydraulic fluid is continuously circulated through this internal passage from the inlet port to the exhaust port of the valve unit, the discharge nozzles at each end of the spool being equal in area so that the rate of flow from each end of the spool is equal and the spool is normally balanced. Means controlled by an electrical element have been provided for producing a difference in the rate of flow between the spool discharge nozzles. An unbalanced condition results, and the spool construction includes means responsive to this unbalanced condition for producing a change in spool position such as will tend to restore a balanced condition in a new spool position.

The present invention provides an improved construction for a valve unit of this type, including improved means for controlling spool position in response to an input signal to the electric component.

In the improved construction of the invention, the hydraulic valve and electrical actuating element are arranged in a common casing in side-by-side relation. The electric actuating element is preferably a "force motor," this being a type of device where the motor armature has a to and fro movement, with the amount of movement being proportional to the input current. Certain features of the invention are not limited to use in combination with a force motor, and therefore, it is to be understood that the use of this term and particular type of device herein is illustrative, not delimitative.

The improved means for causing a change in the position of the hydraulic valve spool in response to energization of the force motor, consists of a pair of drive members, one of which is located at each end of the valve spool. Each drive member controls valve means which regulates the rate of flow of hydraulic fluid from the discharge nozzle of the spool adjacent the drive member. The drive members are each connected to the armature, or movable element, of the force motor, so that when the force motor is energized, the drive levers are moved, causing a difference in the rate of flow at the spool discharge nozzles, and a consequent change of position of the spool to neutralize such difference in flow. Preferably, the drive members are each mounted on a fulcrum so as to act as a lever, and preferably the fulcrum is formed by a flexible diaphragm, which also acts to seal the force motor from the hydraulic circuit of the unit.

A metallic material is preferred for the diaphragm so that it will be effective as a seal under high pressures and without such distortion as would materially change the location of the fulcrum point which it defines. A preferred construction is employed for mounting the diaphragm and drive lever as a unit, or sub-assembly, and which permits the diaphragm to be mounted in sealed relation with the structure of the valve casing, and the drive lever mounted in sealed relation with the diaphragm.

Means are included for adjusting the connection between each drive lever and the force motor armature, with the inclusion of a flexible element in this connection to compensate for the linear and oscillating types of motion of these two elements; for adjusting the valve means of a drive lever relative to the spool discharge nozzle; and for adjusting the centered, or normal position of the force motor and drive levers, thereby also adjusting the centered position of the valve spool.

Among the features of the invention are the following: the resulting construction is extremely compact; the force motor is isolated from the hydraulic system of the unit without the necessity of attempting to apply seals to the motor itself; and, the mechanism consisting of the interconnected force motor armature, drive levers and their diaphragm fulcrums for positioning the valve spool is substantially balanced against acceleration or inertia forces. This valve spool positioning mechanism also permits the input-output ratio of the valve unit to be selected. By input-output ratio is meant the ratio of force motor armature movement compared to valve spool movement, and this ratio depends upon the location of the fulcrums for the drive levers.

Other features and advantages will appear from the following description of the representative embodiment of the invention disclosed in the accompanying drawing and hereinafter described.

This drawing comprises the following views:

Figure 1, a sectional elevation through an electro-hydraulic valve unit constructed in accordance with the invention. For the sake of clarity, certain parts are shown in schematic form in this view;

Figure 2, an enlarged sectional elevation showing the construction and mounting of one of the drive lever assemblies; and Figure 3, a perspective view of an alternate type of diaphragm construction.

In Figure 1 the valve unit components are contained in a casing indicated generally by the reference 21. This casing is of composite construction and includes a force motor housing 22 having a removable cover 23, a valve body 24 and a pair of valve body end caps 25 and 26.

A force motor assembly is mounted in the housing 22. The principal components of the force motor are shown in this schematic view. These components include a field structure 30, field coils 31 and 32, and an armature 33 which is mounted for linear movement on a shaft 34 suspended between a pair of leaf springs 35 and 36, A more complete description of a force motor of similar type and operating characteristics is contained in U.S. Patent 2,859,391 of Donald W. Ericson, dated November 4, 1958. This type of force motor is particularly suited for use in the valve unit of the present invention and has therefore been illustrated in the preferred construction. Movement of the armature 33 in a force motor of this type is proportional in direction and magnitude to the direction and magnitude of the electrical signal applied to the field coils or to any difference between electrical signals applied.

The force motor housing 22 includes an electrical connector 38 having a pair of terminals 39 through which current may be supplied to field coil 31, and a second pair of terminals 40 connected to field coil 32.

A valve spool 42 is mounted in a bore 43 in the valve body 24 and is provided with four control lands numbered 44, 45, 46 and 47. The spool 42 is formed with a central longitudinal bore 48 and in this bore 48 are provided a pair of filters 50, a pair of internal orifices 51 and 52 and a pair of discharge nozzles 54 and 55. The discharge nozzles extend into chambers 56 and 57 formed in the end caps 25 and 26 respectively.

Hydraulic fluid is supplied to the valve body 24 through an inlet port 60 and is exhausted through a port 61. A passage 62 is formed through the wall of the valve spool between lands 45 and 46 and permits fluid from inlet port 60 to pass into the central bore of the spool where it flows equally at a rate restricted by the internal orifices 51 and 52 through the discharge nozzles 54 and 55 and into chambers 56 and 57. These chambers are connected with the exhaust port 61 by passages 64 and 65.

The valve spool 42 controls flow of fluid to either of two outlet ports 66 and 67, depending upon the position of the spool. A shifting of the spool to the left of centered position shown opens outlet port 66 to inlet pressure and connects outlet port 67 to exhaust. This connection includes passage 68 which appears partly in dotted lines since it runs behind the ports 60, 66 and 67. A shifting of the spool to the right has an opposite effect, establishing a pressure connection to outlet port 67 and a return flow through port 66 to exhaust.

The position of valve spool 42 is determined by the position of the force motor armature 33 by driving the spool from the force motor through a pair of drive members 70 and 71 which are located at opposite ends of the force motor and valve spool. Each of these members is provided with a valve means schematically illustrated at 74 in Figure 1 for regulating the flow of fluid from the valve spool discharge nozzles 54 and 55. Drive members 70 and 71 are each connected to the force motor armature 33 for movement in unison therewith. This connection consists of a flexible member or wire 76 which is rigidly connected at one end to the force motor shaft 34 and is adjustably connected at the other end to the drive member by the use of a threaded end piece 77 (Figure 2) and a pair of nuts 78.

Preferably, drive members 70 and 71 are pivotally mounted to act as levers, as shown. This permits the drive ratio of force motor armature movement to valve spool movement to be selected as a function of the location of the fulcrum of the drive levers along their length. Such a pivotal mounting for each of the levers 70 and 71 is schematically illustrated in Figure 1 by the member 80 which is a flexible diaphragm forming part of a housing 81. Each diaphragm member 80 acts as a fulcrum for one of the drive levers and also establishes a seal between the force motor and valve elements of the unit so that no hydraulic fluid can enter the force motor housing 22. A detailed showing of the diaphragm and drive lever construction is contained in Figure 2 and is described hereafter.

Any change in the rate of flow from the discharge nozzles 54 and 55 will result in a change in pressure within the valve spool between discharge nozzle 54 and internal orifice 51 at one end of the valve spool, or between discharge nozzle 55 and internal orifice 52 at the other end. Such internal pressures are applied to the face 82 of land 44 at the left of the valve spool through a passage 83, and to the face 84 of land 47 at the right of the valve spool through a passage 85. For example, a shifting of the drive members 70 and 71 to the left will be accompanied by an increase in pressure against face 84 of the valve spool and a decrease in pressure against face 82 thereof. The valve spool will shift position, normally without any contact between it and the drive levers, until this pressure differential is neutralized. This action will result from movement of the force motor armature 33 to the right (as by energization of field coil 32) and fluid pressure will be supplied by the valve unit through discharge port 66. The rate of fluid flow will depend upon the extent of spool movement.

When the force motor armature returns to a centered or normal position as shown, this movement will be accomplished by an opposite reaction upon the valve spool. Return movement of the force motor armature will, in the absence of a positive control signal, be produced by springs 35 and 36 aided by a set of secondary springs 88 and 89 which act upon an extension 90 on the drive lever 70. Centered position of the force motor armature and drive levers and hence of the valve spool can be adjusted through secondary spring 88 which is connected to an adjusting screw 91 so that the centering action of the secondary springs can be changed.

In Figure 2 the drive lever supporting housing 81 is shown mounted in a cylindrical socket 92 in the force motor housing 22 and in the valve body end cap 26, a seal being established by an O-ring 93. The drive lever fulcrum is formed by a diaphragm 94 which is received within a counterbore in the housing 81 and retained in position by a sleeve 95. This sleeve 95 is secured by swaging the housing inwardly at 96 as shown.

The drive lever assembly is composed of a rod 97 which extends through a central hole 100 in the diaphragm 94. An upper sleeve 98 and a lower sleeve 99 are mounted on the rod and engage opposite faces of the diaphragm around the hole 100. A yoke fitting 101 is threaded on the upper end of the rod 97 and urges the sleeve 98 firmly against the upper surface of the diaphragm to establish a seal. A valve fitting 102 is threaded on the lower end of the rod 97 and similarly acts to force sleeve 99 against the lower surface of the diaphragm to establish a seal. This mounting of the rod 97 in the diaphragm also insures that movement of the drive lever results from flexing of the diaphragm, not rocking of the rod 97 in hole 100, and consequently, the diaphragm augments the stiffness of the servo system as a whole.

Preferably the diaphragm is constructed of a metal such as stainless steel or beryllium copper for high pressure operation and to minimize the amount of diaphragm deflection under high pressure which would cause shifting of the drive lever fulcrum point which the diaphragm defines.

Figure 2 also illustrates the fact that the connection between the end yoke 101 of the drive lever and the end piece 77 of member 76 is adjustable relative to the fulcrum point, or diaphragm 94, as well as relative to the force motor armature and shaft.

The drive lever valve fitting 102 adjustably supports the spool nozzle valve means—a member 104 having a threaded stem 105 engaging fitting 102. Adjusting the valve member 104 relative to the drive lever permits the valve spool to be centered without adjusting the force motor armature position and also permits the normal rate of flow through both discharge nozzles 54 and 55 to be controlled, at least to some extent.

Figure 3 shows the construction of an alternate diaphragm 106 which is preferred for high pressure applications. The flexible wall 108 of this diaphragm is reinforced by a central boss 110 around the drive lever mounting hole 111, and by an outer ring or flange 112. A pair of stiffening ribs 114 extend between the outer flange and central boss on a line which in effect defines the pivotal axis of the drive lever. The inclusion of this stiffening rib restricts flexing of the diaphragm along this line and reinforces it against rupture as well.

It is recognized that changes from the particular electrohydraulic servo valve construction shown may and will be made to adapt the principles of the invention for use with valve units of different sizes and with valve units employing a modified type of valve body or force motors. Such changes and modifications as are within the scope of the following claims are to be considered a part of the present invention.

We claim:

1. An electro-hydraulic servo valve comprising a casing having inlet, outlet and exhaust hydraulic ports therein, a valve spool slidably mounted in said casing and having means for controlling flow between said ports in accordance with the position of said spool, said valve spool having an internal passage longitudinally thereof and terminating in a discharge nozzle at each end of said spool, means intermediate the end of said spool for constantly connecting said passage to said inlet port, an electric actuating element mounted in said casing adjacent said valve spool, said actuating element including an armature displaceable from a normal position in response to the application of an energizing current to said actuating element, means for causing a change in the position in said valve spool in response to a change in the position of said armature comprising a pair of drive members, valve means carried by each of said drive members for regulating the flow from one of said discharge nozzles, means for connecting each of said drive members to said armature whereby each of said drive members is movable relative to one end of said valve spool, and said valve spool having means responsive to the pressure differential produced by a change in the rate of flow from one of said discharge nozzles relative to the rate of flow from the other discharge nozzle for producing a change in spool position such as to neutralize said pressure differential, said pressure responsive means including a pair of fixed area upstream orifices in said valve spool internal passage, each one of said orifices being located between the said connection of said passage to said inlet port and one of said discharge nozzles.

2. An electro-hydraulic servo valve as set forth in claim 1 further including means mounting each of said drive members in said casing for pivotal movement on an axis intermediate the connection between each drive member and said armature and the location of said valve means on said drive member.

3. An electro-hydraulic servo valve comprising in combination a valve body having inlet, outlet and exhaust hydraulic ports therein, a valve spool slidably mounted in said body and having means for controlling flow between said ports in accordance with the position of said spool, said valve spool being of the type having a longitudinal internal passage constantly open to said inlet port and constantly discharging to said exhaust port through a discharge nozzle at each end of said spool, a pair of drive levers, each of said levers being pivotally mounted in said valve body, a portion of each lever being positioned adjacent one of said discharge nozzles and being adapted to act as a valve for such discharge nozzle, means interconnecting said levers, and motor means responsive to an electric control current for pivoting said levers in unison whereby a pressure differential is created between said spool discharge nozzles by the said valve portions of said levers, said spool having means responsive to such pressure differential for producing a change in spool position such as to neutralize said pressure differential, said pressure responsive means including a pair of fixed area upstream orifices each located between one of said discharge nozzles and the opening of said spool internal passage to said inlet port, and a pair of surfaces each responsive to the pressure between one of said discharge nozzles and the orifices upstream therefrom.

4. An electro-hydraulic servo valve according to claim 3 wherein said motor means includes an armature and further characterized by said means inter-connecting said levers including said armature.

5. An electro-hydraulic servo valve according to claim 3 wherein said motor means includes field structure and an armature mounted for linear movement to either side of a normal position in proportion to the direction and magnitude of an electric signal applied to said field structure, means mounting said armature in said casing for movement parallel to movement of said valve spool, said means inter-connecting said levers including said armature.

6. An electro-hydraulic servo valve according to claim 5 further characterized by said means inter-connecting the ends of said levers including a flexible member interposed between said armature and each lever.

7. A hydraulic servo valve comprising in combination a valve body having inlet, outlet and exhaust hydraulic ports therein, a valve spool slidably mounted in said body and having means for controlling flow between said ports in accordance with the position of said spool, said valve spool being of the type having a longitudinal internal passage constantly open to said inlet port and constantly discharging to said exhaust port through a discharge nozzle at each end of said spool, a pair of drive levers, each of said levers being pivotally mounted in said valve body, a portion of each lever being positioned adjacent one of said discharge nozzles and being adapted to act as a valve for such discharge nozzle, means interconnecting said levers, and input means for pivoting said levers in unison whereby a pressure differential is created between said spool discharge nozzles by the said valve portions of said levers, said spool having means responsive to such pressure differential for producing a change in spool position such as to neutralize said pressure differential, said pressure responsive means including a pair of fixed area upstream orifices each located between one of said discharge nozzles and the opening of said spool internal passage to said inlet port, and a pair of surfaces each responsive to the pressure between one of said discharge nozzles and the orifices upstream therefrom.

8. A hydraulic servo valve comprising in combination a valve body having inlet, outlet and exhaust hydraulic ports therein, a valve spool slidably mounted in said body and having means for controlling flow between said ports in accordance with the position of said spool, said valve spool being of the type having a longitudinal internal passage constantly open to said inlet port and constantly discharging to said exhaust port through a discharge nozzle at each end of said spool, flapper means for regulating the rate of flow from each of said discharge nozzles, and input means for moving said flapper means in unison whereby a pressure differential is created between said spool discharge nozzles, said spool having means responsive to such pressure differential for producing a change in spool position such as to neutralize said pressure differential, said pressure responsive means including a pair of fixed area upstream orifices each located between one of said discharge nozzles and the opening of said spool internal passage to said inlet port, and a pair of surfaces each responsive to the pressure between one of said discharge nozzles and the orifices upstream therefrom.

9. An electro-hydraulic servo valve according to claim 7 further characterized by said means inter-connecting said levers including means for adjusting the distance between said levers and for adjusting the point of connection to said levers relative to the pivotal axis thereof.

10. An electro-hydraulic servo valve according to claim 7 further characterized by resilient means engaging at least one of said levers for defining the normal position thereof, and means for adjusting the centering effect of said resilient means to vary the centered position established thereby.

References Cited in the file of this patent

UNITED STATES PATENTS

| | | |
|---|---|---|
| 2,500,407 | Segerstad | Mar. 14, 1950 |
| 2,601,867 | Alyea | July 1, 1952 |
| 2,615,466 | Garde | Oct. 28, 1952 |
| 2,709,421 | Avery | May 31, 1955 |
| 2,790,427 | Carson | Apr. 30, 1957 |
| 2,824,574 | Place | Feb. 25, 1958 |
| 2,832,365 | Smith | Apr. 29, 1958 |
| 2,879,467 | Stern | Mar. 24, 1959 |
| 2,915,077 | Wehrli et al. | Dec. 1, 1959 |
| 2,924,241 | Bauer | Feb. 9, 1960 |

FOREIGN PATENTS

| | | |
|---|---|---|
| 492,292 | Germany | Dec. 1, 1926 |
| 910,115 | France | Jan. 21, 1946 |